United States Patent [19]

Vin

[11] 4,039,037
[45] Aug. 2, 1977

[54] VEHICLE DRIVE TRAIN

[76] Inventor: Jean-Pierre Vin, 12, Place Guy d'Arezzo, Uccle, Belgium

[21] Appl. No.: 636,422

[22] Filed: Dec. 1, 1975

[30] Foreign Application Priority Data

Dec. 13, 1974  Belgium ............................... 151482

[51] Int. Cl.² ........................................... B60K 17/22
[52] U.S. Cl. ................................. 180/24.11; 180/70 P
[58] Field of Search .................... 180/24.11, 22, 24.04, 180/24.08, 24.11, 70 R, 70 P

[56] References Cited

U.S. PATENT DOCUMENTS

| 1,635,657 | 7/1927 | Blumer | 180/24.11 |
| 1,644,023 | 10/1927 | Marcum | 180/24.11 |
| 2,298,334 | 10/1942 | Ash | 180/24.11 X |
| 3,231,039 | 1/1966 | Sauper | 180/70 R |

FOREIGN PATENT DOCUMENTS

| 669,229 | 11/1929 | France | 180/24.11 |
| 62,100 | 3/1940 | Norway | 180/22 |
| 331,499 | 6/1930 | United Kingdom | 180/24.11 |

Primary Examiner—Joseph F. Peters, Jr.
Assistant Examiner—Terrance L. Siemens
Attorney, Agent, or Firm—Finnegan, Henderson, Farabow & Garrett

[57] ABSTRACT

A drive train for a vehicle which includes an engine at the front and driven wheels at the rear thereof, the drive train including a pair of drive shafts extending from the front toward the rear of the vehicle and located substantially lower than an engine output shaft and the rear-wheel axles. The front of each drive shaft is driven from a differential located near the front of the vehicle and through generally vertically extending shafts, while the rear of each drive shaft is interconnected with the rear wheel axles also through generally vertically extending shafts.

5 Claims, 2 Drawing Figures

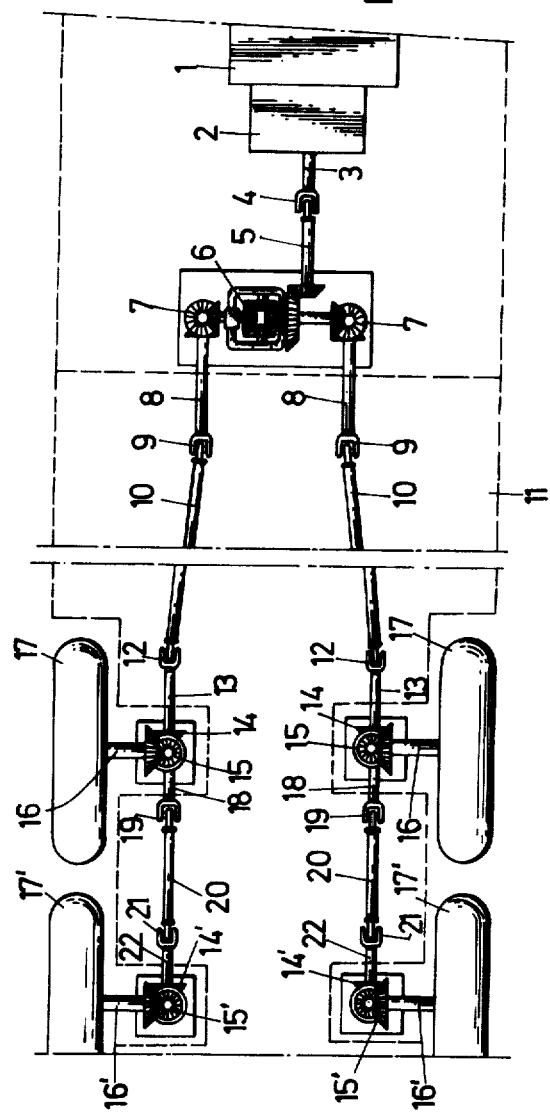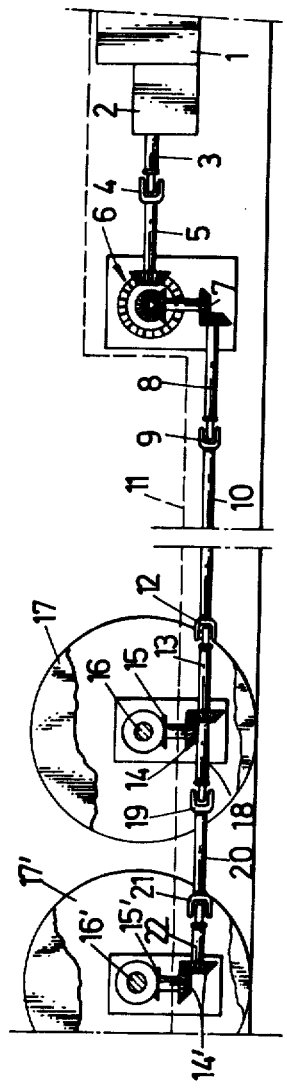

VEHICLE DRIVE TRAIN

It is known that depressed-floor buses have many advantages in every point relative to buses the higher floor of which requires the arrangement of steps or ramps which are a drawback for a rotational operation with such vehicles in town both due to accident dangers and to time losses by boarding.

The depressed arrangement of the floor lowers the centre of gravity and makes boarding easier, which can also be very advantageous for other types of vehicles and notably for furniture vans and some delivery vans.

The use with the purpose of lowering the floor, of a front-wheel drive vehicle with he engine and auxiliary equipment arranged at the front causes many problems which make this solution of little interest if not impossible in town service. For instance the turning circle of a front-wheel drive affects disadvantageously the controllability.

The use of a rear-wheel drive with the engine unit and auxiliary equipment arranged either between the axles or at the back, has the drawback of reducing the useful load area to an unacceptable degree.

The invention has for purpose to provide a solution which does not eliminate any advantage of the usual installation with the engine-gearbox unit and the auxiliary equipment at the front with the back wheels being driven, without however opposing the depressed construction of the vehicle floor.

For this purpose, the engine-gearbox differential gear unit located at the front of the vehicle, is connected to each driving wheel or to each driving wheel pair located at the vechicle back through a drive shaft, each drive shaft being depressed both relative to the driving wheel shaft and to the gearbox output shaft while being driven by said differential gear.

Other details and features of the invention will stand out from the following description given by way of non limitative example and with reference to the accompanying drawings, in which:

FIG. 1 is a diagrammatic plan view of the drive train according to the invention.

FIG. 2 is a diagrammatic side view of the drive train.

In the vehicle fitted with a drive train according to the invention, the engine 1 and the gearbox 2 thereof can be arranged along the vehicle axis, in parallel relationship therewith or at an angle thereto. In this last case, the gearbox output shaft 3 is connected through an universal joint 4 to the imput shaft 5 of a differential gear 6 provided with gear-trains 7 for increasing the speed imparted to both output shafts 8. Said shafts 8 which are in turn connected through universal joints 9 to shafts 10 which form extensions thereof, are thus arranged subsantially lower than the input shaft 5. The spacing between the planes of the input and output shafts is so selected as to determine actually the depressing degree of the drive shafts 10 and floor 11 of the vehicle.

Actually the diameter of the drive shafts 10 has been made possible by the design with multiple high-speed drive shafts. The drive shafts 10 finally drive through universal joints 12, the input shafts 13 of two bevel gear pairs 14 which are followed by speed-reducing gear trains 15 which drive both half-axles 16 of the driving wheels 17. The bevel gear pairs 14 and the speed-reducing gear trains 15 also allow a higher arrangement of said half-axles 16.

FIG. 2 shows the magnitude of the possible lowering for the drive shafts 10, which allows the construction of a vehicle with a strongly-depressed floor 11. Such a construction has also the advantage, not to be neglected, that the load surface is not affected by the room occupied by the engine-gearbox-differential unit, said unit being arranged in the location which is normally provided for the steps in a high-floor vehicle.

When the driving wheels 17 are doubled, that is when the set of wheels 17 is followed by a second set of wheels 17', which are also driving wheels, the shafts 13 can be extended with shafts 18 connected through universal joints 19 to shaft segments 20 which are extended through universal joints 21 by two shafts 22 which drive half-axles 16' by means of bevel gear pairs 14' which are identical with the bevel gear pairs 14 and are followed by speed-reducing gear trains 15' which are identical with the speed-reducing gear trains 15.

The weight and the main cross-section of the above-described vehicle are smaller than the weight and cross-section of usual vehicles with the same capacity. The costs even if they are somewhat higher, are warranted not only by the advantages obtained but also by lower possible running costs.

The invention is in no way limited to the above embodiments and many changes can be brought therein without departing from the scope of the invention as defined by the appended claims.

For instance various components of the drive train according to the invention, such as the universal joints of the bevel gear trains could be replaced by mechanical devices which fulfill the same functions. In the same way, any other suitable type of differential gear, speed-increasing gear and speed-reducing gear could be used.

I claim:

1. A vehicle drive train comprising an engine, an output shaft driven from said engine and drivingly connected to a differential gear train positioned near the front of the vehicle, said differential gear train driving a pair of laterally spaced apart parallel shafts extending generally vertically downwardly of said vehicle near the front thereof, a pair of drive shaft means driven from said parallel shafts and extending rearwardly of said vehicle, a pair of rear gear trains interconnecting said drive shaft means to respective ones of a pair of rear wheels, said rear gear trains each including a generally vertically extending shaft extending upwardly from said drive shaft means toward the center of said rear wheels.

2. A drive train as defined in claim 1 wherein said differential gear train includes a pair of laterally extending shafts interconnected with said parallel shafts by bevel gears, said parallel shafts and said drive shaft means being interconnected by bevel gears, said drive shaft means and said generally vertically extending rear shafts being interconnected by bevel gears.

3. A drive train as defined in claim 1 wherein said drive shaft means include generally horizontal drive shafts diverging toward the rear of said vehicle.

4. A drive train as defined in claim 1 wherein said rear gear trains are speed reducing devices.

5. A drive train as defined in claim 1 wherein said differential gear train is a step-up device.

* * * * *